UNITED STATES PATENT OFFICE.

ARTHUR H. WILLIAMS, OF MANCHESTER, NEW HAMPSHIRE.

HARD FINISH FOR PLASTERING.

SPECIFICATION forming part of Letters Patent No. 392,481, dated November 6, 1888.

Application filed April 25, 1888. Serial No. 271,816. (No specimens.)

*To all whom it may concern:*

Be it known that I, ARTHUR H. WILLIAMS, a citizen of the United States, residing at Manchester, in the county of Hillsborough and State of New Hampshire, have invented certain new and useful Improvements in Hard Finish for Plastering; and I do hereby declare the following to be a full, clear, and exact description of the invention, such as will enable others skilled in the art to which it appertains to make and use the same.

The invention relates to a hard finish for plastering, &c.; and it consists in an improved mixture or composition, either colored or plain, for the purpose, and also in the mixture made according to certain proportions, substantially as will be described and claimed.

My improved hard finish for plastering, &c., has for its main element Francestown soapstone or its equivalent—a soapstone which is obtained at the Francestown quarry, Francestown, New Hampshire. This soapstone is very different from the ordinary soapstone or talc. Chemical analysis shows that, while talc contains some sixty per cent. of silica, ($SiO_2$,) Francestown soapstone contains but forty-five per cent. Further, it is found that Francestown soapstone contains about ten per cent. of oxide of aluminium ($Al_2O_3$)—a chemical which is totally absent in pure talc. The chemical differences result in making Francestown soapstone a much more valuable and useful ingredient in a hard finish such as is contemplated by the present invention, or in a mortar or similar substance, than the common talc, for certain distinctive qualities are possessed by the Francestown soapstone which peculiarly adapt it for these uses.

In addition to Francestown soapstone, I employ in my composition for a hard finish on plastering, plaster-of-paris, (which is sulphate of lime calcined and pulverized.) Five parts of Francestown soapstone are united with one part of plaster-of-paris. Then a small amount of acid is added to the mixture, after which the ingredients are thoroughly mixed together. Any kind of acid may be used—as, for instance, dry cream-of-tartar. The object of the acid is to retard the setting of the calcined plaster. The mixture thus composed is compounded with lime-putty in the proportion of three parts of the former to two of the latter.

When it is desired to color the mixture, a suitable coloring-matter will be added in sufficient quantity to impart the desired color to the mixture. The plain finish will have a warm pearl-gray color, and is not tiresome but pleasing to the eye.

Owing to the chemical properties of the Francestown soapstone, the resulting hard finish of my invention makes a surface which can be washed without injury to the surface or color, one that is impervious to moisture, gases, germs of disease, and stains, and one that can be easily decorated without the use of the customary sizing.

Having thus described my improved hard finish for plastering, what I claim as new, and desire to secure by Letters Patent, is—

1. A hard finish for plastering composed of plaster-of-paris, acid, lime-putty, and a soapstone containing some ten per cent. of oxide of aluminium and some forty-five per cent. of silica, substantially as described.

2. A hard finish for plastering composed of three parts of a mixture of a soapstone containing some ten per cent. of oxide of aluminium and some forty-five per cent. of silica, (five parts,) plaster-of-paris, (one part,) and a small amount of acid, and two parts of lime-putty, substantially as described.

3. A hard finish consisting of plaster-of-paris, acid, lime-putty, a coloring substance, and a soapstone containing ten per cent. of oxide of aluminium and forty-five per cent. of silica, mixed in the proportions substantially as specified.

In testimony whereof I affix my signature in presence of two witnesses.

ARTHUR H. WILLIAMS.

Witnesses:
 C. H. BARTLETT,
 C. A. WILLIAMS.